Jan. 8, 1957   C. D. LOVELACE   2,776,761
BOAT TRAILER AND LOADING DEVICE THEREFOR
Filed Sept. 13, 1954   4 Sheets-Sheet 1

CHARLES D. LOVELACE INVENTOR
BY
ATTORNEYS.

Jan. 8, 1957 C. D. LOVELACE 2,776,761
BOAT TRAILER AND LOADING DEVICE THEREFOR
Filed Sept. 13, 1954 4 Sheets-Sheet 2
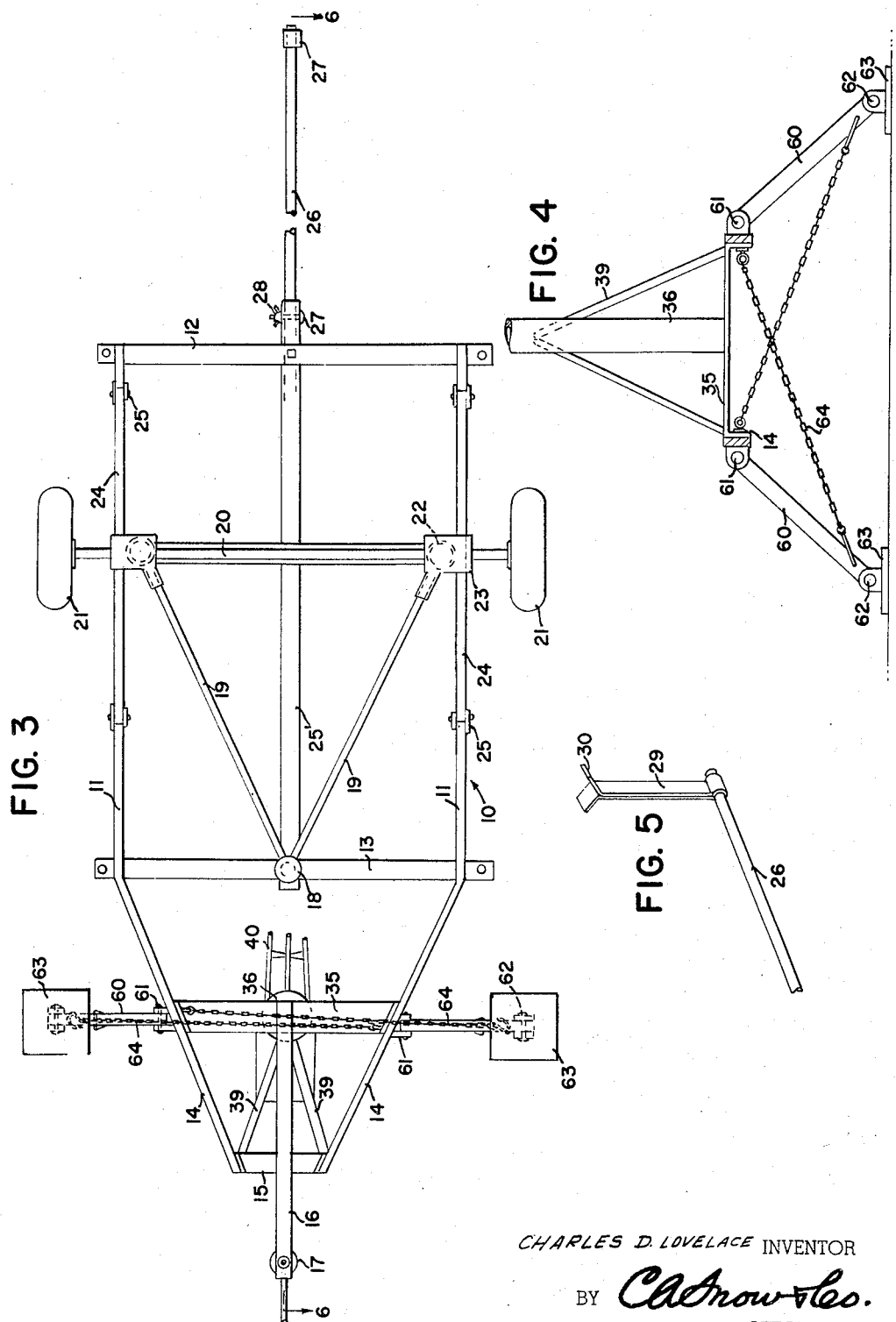
CHARLES D. LOVELACE INVENTOR
BY CA Snow &Co.
ATTORNEYS.

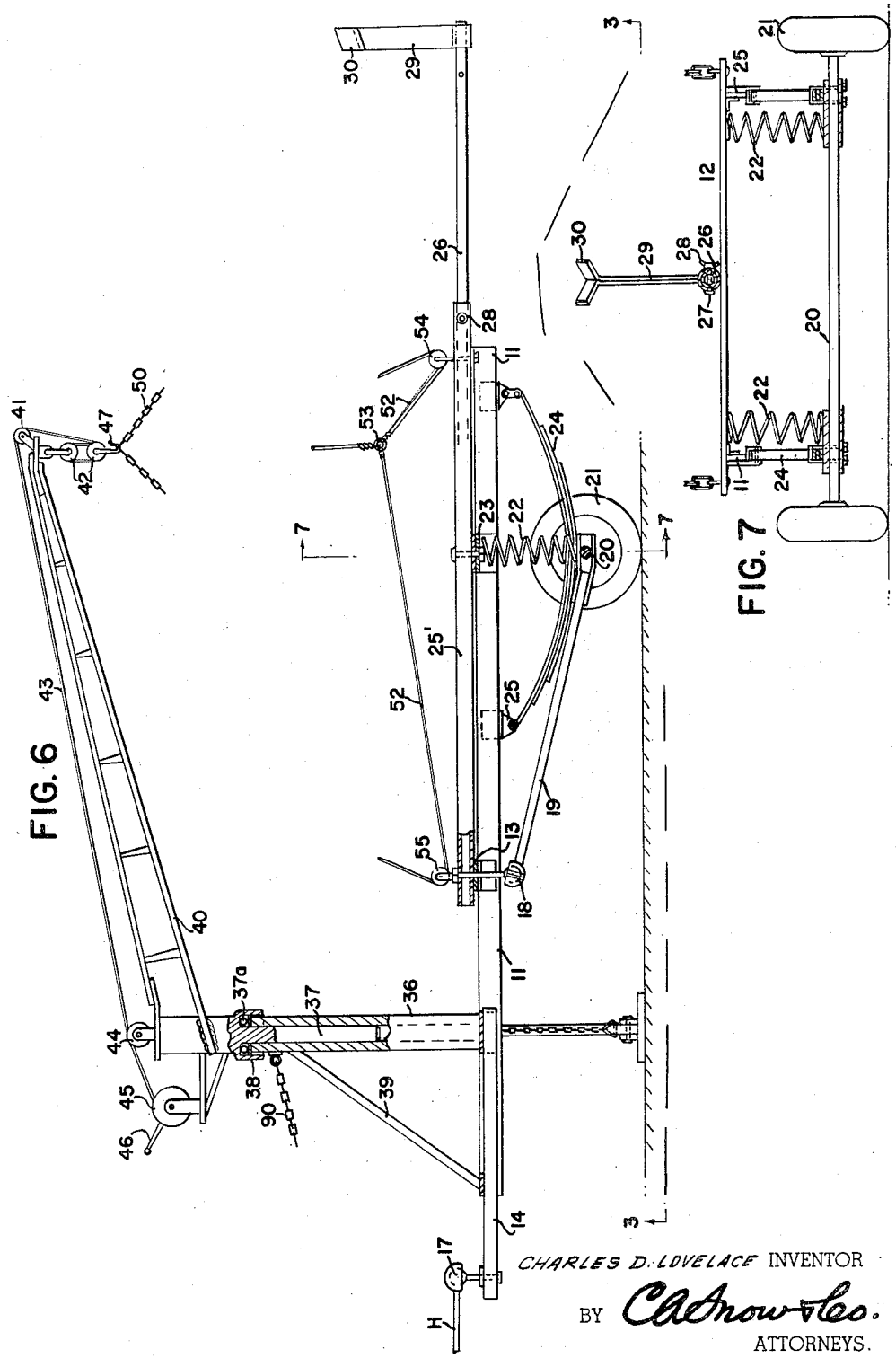

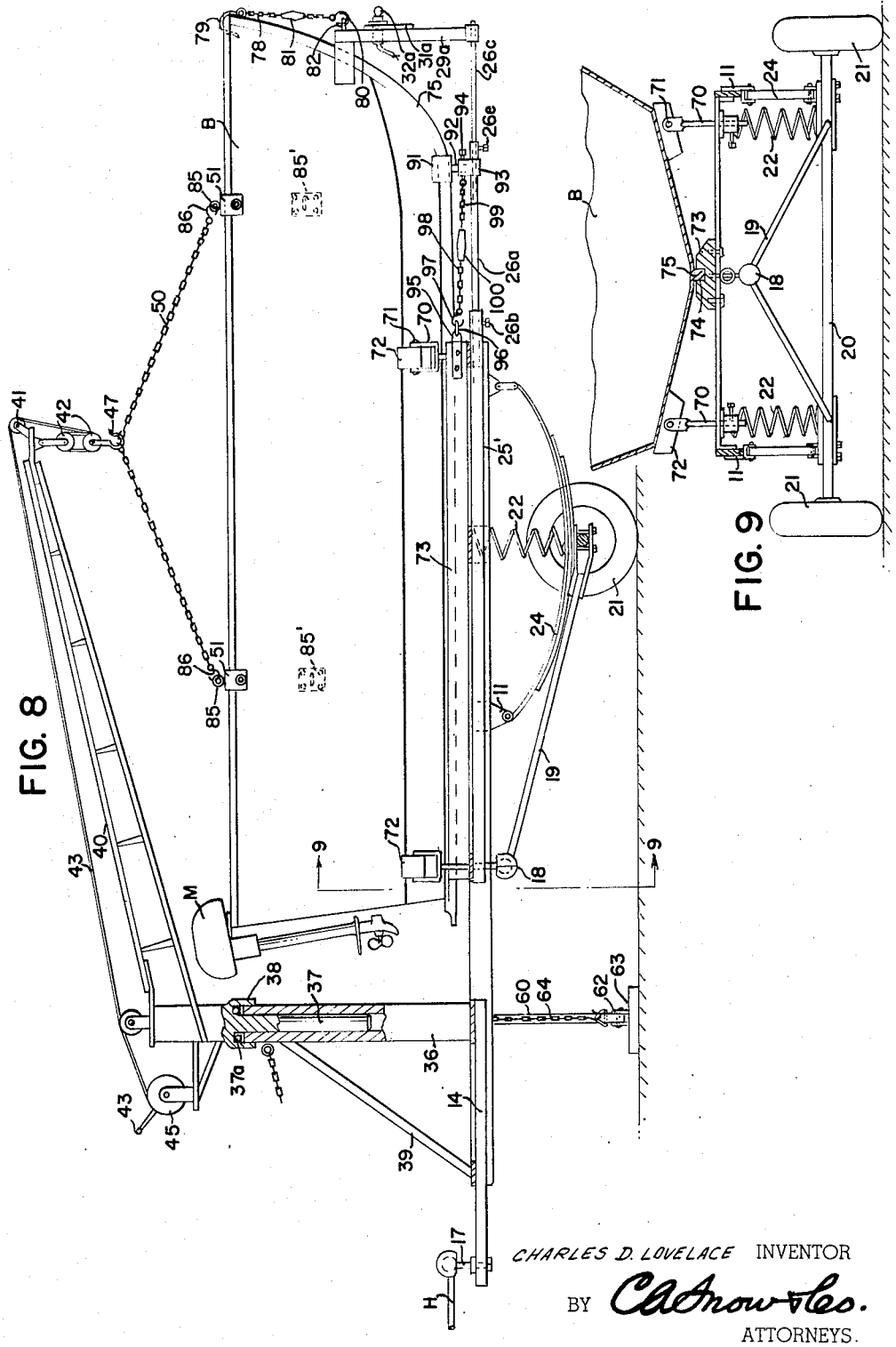

United States Patent Office 2,776,761
Patented Jan. 8, 1957

2,776,761

BOAT TRAILER AND LOADING DEVICE THEREFOR

Charles D. Lovelace, Bandera, Tex.

Application September 13, 1954, Serial No. 455,674

2 Claims. (Cl. 214—75)

This invention relates to a boat trailer and loading means therefor, and has as its primary object the provision of an improved boat trailer of relatively short length, which will at the same time provide adequate support for a relatively long small boat, such as an outboard motor boat.

An additional important object of the invention is the provision in association with a device of this character of a davit or crane which will facilitate the loading and unloading of a boat therefrom.

As conducive to a clearer understanding of this invention, it should here be pointed out that in the conventional boat trailer, the boat is unloaded by the tilting of the trailer, customarily stern first, which results in a material impact against the stern of the boat, and, in the case of outboard motor boats, frequently results in material damage to the outboard motor which is eliminated by the present invention.

An important object of this invention is, therefore, the provision of means whereby the boat may be unloaded from the trailer and deposited gently in the water, so that substantially the full length of the boat impacts the water at the same time, thus materially reducing the shock of the impact.

An additional object of the invention is the provision of means in association with such trailer whereby the boat may be readily lifted from the water in such manner as to reduce the effort incident thereto to a minimum.

Still another object of the invention resides in the provision of means in association with the boom or davit aforementioned which will preclude the tilting or tipping of the trailer during the loading and unloading operation.

Still another object of the invention resides in the provision of an extensible boom associated with the trailer, whereby the overhanging portion of the boat may be readily supported, the boom being adjustable to accommodate various lengths of small boats.

Still other objects reside in the combinations of elements, arrangements of parts, and features of construction, all of which will be more fully pointed out hereinafter, and shown in the accompanying drawings.

In the drawings:

Figure 3 is a bottom plan view of the trailer with the boat removed therefrom, and having the crane or davit also removed therefrom.

Figure 4 is a sectional view, on an enlarged scale, taken substantially on the line 4—4 of Figure 1 as viewed in the direction indicated by the arrows.

Figure 5 is a fragmentary enlarged perspective view of a constructional detail.

Figure 6 is a sectional view, partially broken away, taken substantially along the line 6—6 of Figure 3 as viewed in the direction indicated by the arrows.

Figure 7 is a sectional view taken substantially along the line 7—7 of Figure 6 as viewed in the direction indicated by the arrows.

Figure 8 is a view similar to Figure 1, but on an enlarged scale, showing a modified form of construction, and Figure 9 is a sectional view taken substantially along the line 9—9 of Figure 8 as viewed in the direction indicated by the arrows.

Similar reference characters refer to similar parts throughout the several views of the drawing.

Figure 1:
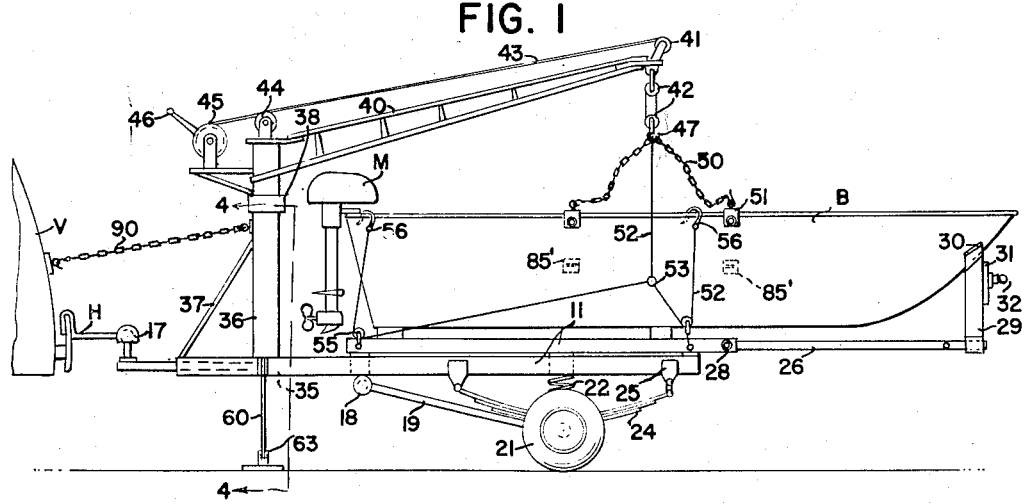
Figure 1 is a side elevational view of one form of trailer embodying features of the instant inventive concept disclosing a boat mounted thereon.
Figure 2:
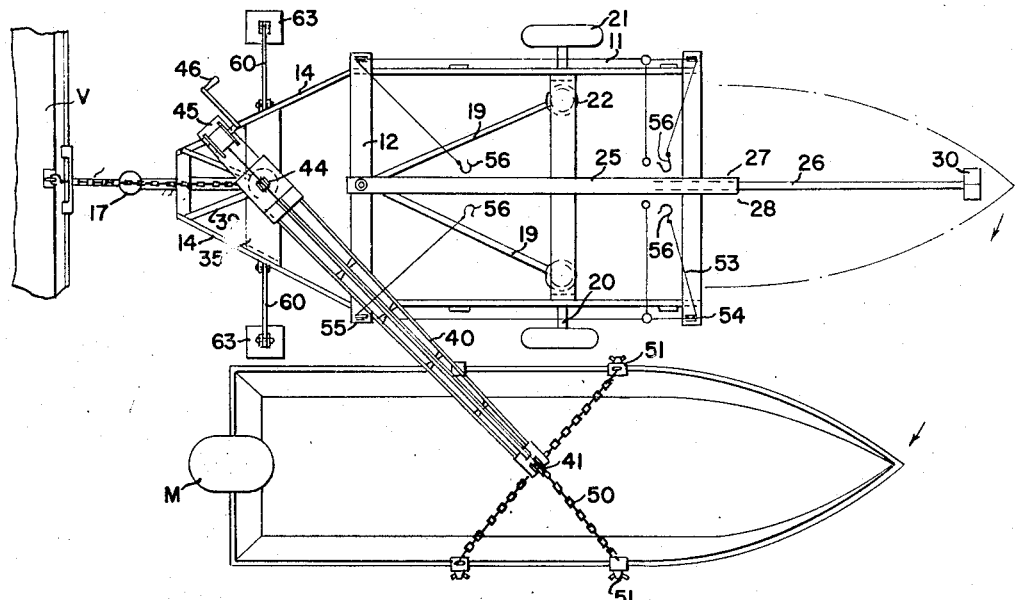
Figure 2 is a top plan view of the construction of Figure 1 disclosing the boat in the course of being unloaded therefrom, the former position of the boat being indicated by dotted lines.

Having reference now to the drawing in detail, the trailer of the instant invention is comprised of a main frame generally indicated at 10, which includes a pair of opposite side pieces 11, a rear cross member 12, and a front cross member 13. From cross member 13 a pair of converging supporting members 14 terminate in a front cross piece 15, to which is secured a longitudinally extending member 16 supporting a hitch knob 17 of conventional design, by means of which the trailer is adapted to be attached to a towing vehicle. Extending outwardly from a central position on cross member 13 and secured as indicated at 18 are a pair of diverging reinforcing rods 19, which extend outwardly and downwardly to a point adjacent the side frame members 11. The members 19 are secured to an axle 20, which carries at its opposite extremities wheels 21, preferably of the conventional rubber tired variety, and from the juncture of rods 19 with axle 20, coil springs 22 extend upwardly to plates 23 secured to the side frame members 11. Leaf springs 24 connected to the axle 20 are secured to brackets 25 carried by each of the side frame members 11 to support the trailer in a resilient fashion.

Extending from the rear cross piece 12 forwardly to cross piece 13 is a hollow tubular member 25′ which has slidably contained therein an extensible boom 26, adapted to be held in position by means of a clamping bolt 27 and wing nut 28. At the forward extremity of boom 26 is an upwardly extending member 29, which terminates in a bifurcated portion 30 adapted for the reception of the bow of the boat. Upstanding member 29 may carry a plate 31 bearing license plate of boat, and a suitable light 32, which is adapted to be connected by suitable wiring (not shown) with the interior of the towing vehicle.

Extending between the converging members 14 at an intermediate point thereof is a supporting plate 35, from the center of which there extends upwardly a tubular member 36, within which is mounted rotatably a shaft 37, ball bearings 37a (see Figure 6), being provided to permit the free rotation of the shaft 37 and its associated collar 38 relative to the tubular member 36. A pair of diverging stays or braces 39 extend forwardly from the tubular member 36 to the junctures of each of diverging members 14 with the front cross member 15. Rotatable member 37 carries a boom 40, which is provided at its outer end with a pulley 41, which is connected to a block and tackle arrangement 42. A cord 43 extends from the block and tackle arrangement 42 over the pulley 41 and thence over a pulley 44 carried by the top of shaft 37 to a winch or roller 45, provided with a crank handle 46. The arrangement is such that rotation of crank 46 will serve to raise or lower the hook 47 secured at the end of the block and tackle assembly 42 at the end of boom 40.

Chains 50 are extended in diametrically opposed directions from the hook 47, and terminate in clamps 51 which are adapted to be engaged over the gunwales of the boat B which is adapted to be carried by the trailer.

Securing means for the boat B and its outboard motor

M are provided and take the form of resilient cords 52, which are secured to hook 47, and extend to a common juncture point 53, and thence downwardly over pulleys 54 and 55 adjacent the front and rear ends of the trailer, respectively, the cords each terminating in hooks 56 which are adapted, when the boat is in secured position, to engage over the opposite gunwales thereof to hold the same tightly on the trailer body.

Supporting means are provided to preclude tilting of the trailer when the boat is being raised or lowered and the boom is rotated into off center position, and take the form of legs 60 pivotally mounted as at 61 on opposite sides of cross piece 35. The pivoted members 60 have pivotally secured thereto as by pivots 62 feet 63, which extend outwardly from the sides of the frame, and serve to support and stabilize the same during lifting operations. Crossed chains 64 extend between the lower portions of legs 60 and members 14, to prevent slippage of the members during the operation of the device.

From the foregoing, the operation of the device should be readily understandable. The boat, when it is desired to position the same on the trailer, is secured by means of the clamps 51 to the chains 50, which in turn are secured to the hook 47. Rotation of the crank handle 46 causes rotation of winch 45, which through cable or cord 43 serves to lift the boat. Boom 40 is then rotated on bearings 37a, until the boat is in an appropriate position over the trailer, whereupon the same is lashed down by means of cables 52 and their associated hooks 56.

When it is desired to unload the boat, the same procedure is followed, in reverse, the hooks 56 being released, the boat lifted from the trailer, the boom 40 moved to a desired position, and by release of winch 45, the boat lowered into the water, as desired.

Referring now to Figures 8 and 9, there is shown a slightly modified form of construction, the parts bearing similar reference characters being identical to the parts previously described. However, in this illustrative embodiment the supporting means for the boat take the form of struts 70, having pivoted as by pivots 71 to their upper extremities, shoes 72 which are adapted to engage the underside of the boat. A keel plate 73 is also provided which extends longitudinally of the frame, and is provided with a centrally positioned groove 74 adapted for the reception of the keel 75 of boat B. In this modification, the boom 26 takes the form of one extending member 26a, secured in position within the tubular member 25' as by means of a set screw 26b. The boom 26a is also hollow and contains a further extending boom 26c, adapted to be secured in position by set screw 26e.

The upright member 29a is also provided, as is the case with upright 29, with a suitable plate 31a for the accommodation of a number or the like and a light 32a. In this modification, the bifurcated member 30a, instead of extending upwardly as in the foregoing modification, extends inwardly to extend about the sides of the boat and seat against the bow. A locking chain 78 provided at its opposite ends with hooks 79 and 80, and a turnbuckle 81 is adapted to extend between the top of the bow of the boat B and a loop or eye 82 fixedly secured to the top of the upright member 29a. Further, in this modification there are positioned interiorly of the boat suitable loops or eyes 85, to which the cables 52 and their associated hooks 56 may be secured in relatively permanent relationship. Similarly, the eyes 85 may serve to receive the hooks 86 on the ends of chains 50 which normally engage the clamping members 51 of the foregoing described modification.

Clamped to the bow end of the keel 75 is a clamp 91 which is provided with a stem 92 fitted in a socket formed in the block 93 rising from the member 26a and held in position by set screw 94.

A cleat 95 extends forwardly from the bow end of keel plate 73 and is provided with a ring 96 in which the hook 97 of the chain section 98 is held. Chain section 99 is secured to the block 93, and the adjacent ends of the chain sections 98 and 99 are connected by a turnbuckle 100 so that by operating the turnbuckle, the boat being carried on the trailer will be held against shifting rearwardly during transportation.

In this construction, the arrangement is otherwise similar to that previously described, and the operation thereof is the same.

It may here be pointed out that the towing vehicle V is provided with the customary trailer hitch H, and a chain 90 may be suitably connected between the upright 36 and the rear of the vehicle for further stabilizing the trailer.

From the foregoing, it will now be seen that there is herein provided an improved boat trailer and lifting device therefor which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

What is claimed is:

1. In a boat trailer, a frame embodying spaced side bars, front and rear cross bars connecting the front and rear ends respectively of said side bars, a tubular member having one of its ends secured to the rear cross bar, an extensible boom slidably mounted in said tubular member extensible to a position beyond the end of said tubular member, a supporting member rising from one end of said boom, said supporting member having a bifurcated upper end in which the bow of a boat rests, holding said boat against lateral movement with respect to the boom, and means for lashing the boat positioned on the trailer to said trailer.

2. In a boat trailer, a wheel supported frame, a pair of converging supporting members extending forwardly from said frame to which a towing vehicle is hitched, stabilizing leg members pivotally connected to said converging supporting members, said leg members adapted to swing downwardly into contact with the ground surface, said leg members, being inclined outwardly away from said frame, and feet on the free ends of said leg members resting on the ground surface.

References Cited in the file of this patent

UNITED STATES PATENTS

| | | |
|---|---|---|
| 1,106,094 | Harbinger | Aug. 4, 1914 |
| 2,342,942 | Johnston | Feb. 29, 1944 |
| 2,444,231 | Sanford | June 29, 1948 |
| 2,452,938 | Krake | Nov. 2, 1948 |
| 2,479,009 | Holmes et al. | Aug. 16, 1949 |
| 2,496,401 | McKinney | Feb. 7, 1950 |
| 2,636,745 | Cartwright | Apr. 28, 1953 |
| 2,660,443 | Miller | Nov. 24, 1953 |
| 2,700,480 | Triplett | Jan. 25, 1955 |
| 2,713,951 | Davies | July 26, 1955 |